US012698901B2

(12) United States Patent
Ackermann et al.

(10) Patent No.: US 12,698,901 B2
(45) Date of Patent: Aug. 4, 2026

(54) GAS TURBINE ENGINE WITH IMPROVED HIGH PRESSURE COMPRESSOR LEAKAGE PATH GUIDE STRUCTURE

(71) Applicant: Raytheon Technologies Corporation, Farmington, CT (US)

(72) Inventors: William K. Ackermann, East Hartford, CT (US); Andrew E. Breault, Bolton, CT (US); Thomas E. Clark, Wells, ME (US); Daniel B. Kupratis, Wallingford, CT (US)

(73) Assignee: RTX CORPORATION, Farmington, CT (US)

( * ) Notice: Subject to any disclaimer, the term of this patent is extended or adjusted under 35 U.S.C. 154(b) by 7 days.

(21) Appl. No.: 18/208,113

(22) Filed: Jun. 9, 2023

(65) Prior Publication Data

US 2024/0410587 A1 Dec. 12, 2024

(51) Int. Cl.
*F23R 3/60* (2006.01)
*F01D 5/08* (2006.01)
(Continued)

(52) U.S. Cl.
CPC ............... *F23R 3/60* (2013.01); *F01D 5/082* (2013.01); *F01D 9/023* (2013.01); *F02C 7/18* (2013.01)

(58) Field of Classification Search
CPC .... F02C 7/18; F23R 3/60; F01D 5/082; F01D 5/081; F01D 25/14; F01D 25/243; F01D 25/28; F01D 11/00; F01D 11/001; F01D 11/02; F01D 9/023; F05D 2260/14; F05D 2260/6022
See application file for complete search history.

(56) References Cited

U.S. PATENT DOCUMENTS

| | | | |
|---|---|---|---|
| 6,722,138 B2 | 4/2004 | Soechting | |
| 7,036,320 B2 * | 5/2006 | Coulon ..................... | F02C 7/18 |
| | | | 60/785 |

(Continued)

FOREIGN PATENT DOCUMENTS

| | | | |
|---|---|---|---|
| FR | 2883926 B1 | 9/2010 | |

OTHER PUBLICATIONS

EP Search Report for EP Patent Application No. 24181150.4 dated Nov. 15, 2024.

*Primary Examiner* — Gerald L Sung
*Assistant Examiner* — Jingchen Liu
(74) *Attorney, Agent, or Firm* — Getz Balich LLC

(57) ABSTRACT

A gas turbine engine having an axial centerline is provided that includes compressor, combustor, and turbine sections, a tangential on board injector (TOBI) system, and an HPC leakage guide structure. The compressor section has a high pressure compressor (HPC) that includes an HPC aft hub. The TOBI system extends circumferentially around the engine axial centerline, and has a plurality of nozzles and an inner radial flange. The HPC leakage guide structure has forward and aft ends. The forward end is disposed and configured to receive a leakage flow from the HPC and the aft end is engaged with the TOBI inner radial flange. The HPC leakage guide structure and the HPC aft hub define an HPC aft hub cavity. The HPC aft hub cavity extends between the forward and aft ends and has a flow area that is non-decreasing in a direction from the forward end to the aft end.

13 Claims, 6 Drawing Sheets

(51) Int. Cl.
  *F01D 9/02*   (2006.01)
  *F02C 7/18*   (2006.01)

(56)       References Cited

U.S. PATENT DOCUMENTS

| | | | |
|---|---|---|---|
| 7,465,148 B2 | 12/2008 | Klinger | |
| 10,087,775 B2 * | 10/2018 | Mulcaire | F02C 7/185 |
| 10,393,024 B2 | 8/2019 | Stevens | |
| 10,704,468 B2 | 7/2020 | Suciu | |
| 10,968,760 B2 | 4/2021 | Roberge | |
| 11,346,282 B2 | 5/2022 | Reba | |
| 2016/0069267 A1 * | 3/2016 | Philbrick | F16B 39/021 |
| | | | 29/525.01 |
| 2016/0102692 A1 * | 4/2016 | James | F01D 25/265 |
| | | | 29/428 |
| 2018/0058329 A1 * | 3/2018 | Stevens | F01D 5/082 |
| 2020/0063564 A1 * | 2/2020 | Tatman | F01D 5/082 |

\* cited by examiner

GAS TURBINE ENGINE WITH IMPROVED HIGH PRESSURE COMPRESSOR LEAKAGE PATH GUIDE STRUCTURE

BACKGROUND OF THE INVENTION

1. Technical Field

The present disclosure relates to gas turbine engines in general and to gas path components in communication with a high pressure compressor hub in particular.

2. Background Information

Modern gas turbine engines are pushed to provide higher thrust levels and ever-better performance, at minimum weight and at an acceptable cost. Engine weight requirements are particularly insidious because they impact all other metrics. To satisfy weight requirements, engine designers are challenged to use the thinnest possible metallic structures whenever possible. As a result, light-weight sheet-metal structures are common in modern gas turbine engines. Unfortunately, these same sheet-metal structures are also more susceptible to airflow/vibrational effects. For example, a thin bell-shaped heat-shield can be forced to oscillate in a 4-noded clover-shaped pattern with relative ease simply by impinging a small amount of airflow around its circumference. A cacophony of individual vibration drivers existing within an operating engine can produce vibrational oscillation of a component and that oscillation can in turn produce undesirable fatigue. Unsupported thin sheet-metal structures are particularly vulnerable because relatively low magnitude forces can cause oscillatory deflection. As a result, component durability concerns exist whenever large system energy levels (e.g., high rotor speeds, pressures, velocities, and the like) are present.

SUMMARY

According to an aspect of the present disclosure, a gas turbine engine having an axial centerline is provided that includes a compressor section, a combustor section, a turbine section, a tangential on board injector (TOBI) system, and an HPC leakage guide structure. The compressor section has a high pressure compressor (HPC) that includes an HPC aft hub. The combustor section includes a combustor. A core gas path extends through the compressor section, the combustor section, and the turbine section. The TOBI system extends circumferentially around the engine axial centerline, and the TOBI system has a plurality of nozzles and an inner radial flange. The HPC leakage guide structure (LGS) has an LGS forward end and an LGS aft end. The LGS forward end is disposed and configured to receive a leakage flow from the HPC and the LGS aft end is engaged with the TOBI inner radial flange. The HPC leakage guide structure and the HPC aft hub are separated from one another and define an HPC aft hub cavity therebetween. The HPC aft hub cavity extends between the LGS forward end and the LGS aft end and has a flow area that is non-decreasing in a direction from the LGS forward end to the LGS aft end.

In any of the aspects or embodiments described above and herein, the LGS aft end may be biased against the TOBI inner radial flange.

In any of the aspects or embodiments described above and herein, the LGS aft end and the TOBI inner radial flange may be configured for mechanical engagement with one another.

In any of the aspects or embodiments described above and herein, the mechanical engagement of the LGS aft end and the TOBI inner radial flange may be a mating configuration, and that mating configuration may be a splined configuration.

In any of the aspects or embodiments described above and herein, the HPC aft hub cavity may be monotonically increasing in the direction from the LGS forward end to the LGS aft end.

In any of the aspects or embodiments described above and herein, the LGS aft end and the TOBI inner radial flange may be configured for mechanical engagement with one another.

In any of the aspects or embodiments described above and herein, the HPC aft hub cavity may be monotonically increasing in the direction from the LGS forward end to the LGS aft end from a forward end of the HPC leakage guide structure to a position proximate to where the LGS aft end and the TOBI inner radial flange are.

In any of the aspects or embodiments described above and herein, the HPC leakage guide structure may have a thickness that extends between two surfaces and the HPC leakage guide structure may be a solid panel.

In any of the aspects or embodiments described above and herein, the HPC leakage guide structure may have a thickness that extends between two surfaces and the HPC leakage guide structure may include a plurality of apertures extending through the thickness.

In any of the aspects or embodiments described above and herein, the gas turbine engine may further include an inner diffuser case disposed radially inside of and spaced apart from the combustor, wherein the inner diffuser case and the combustor define a diffuser inner diameter cavity there between. The inner diffuser case may be disposed radially outside of and spaced apart from the HPC leakage guide structure. The inner diffuser case and the HPC leakage guide structure may define a diffuser secondary cavity there between.

In any of the aspects or embodiments described above and herein, the HPC leakage guide structure may be connected to the inner diffuser case.

In any of the aspects or embodiments described above and herein, the HPC leakage guide structure may include an LGS mounting flange disposed proximate to the LGS forward end and the LGS mounting flange may be connected to the inner diffuser case.

In any of the aspects or embodiments described above and herein, the HPC leakage guide structure may have a thickness that extends between two surfaces and the HPC leakage guide structure may include a plurality of apertures extending through the thickness thereby providing a fluid passage between the HPC aft hub cavity and the diffuser secondary cavity.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
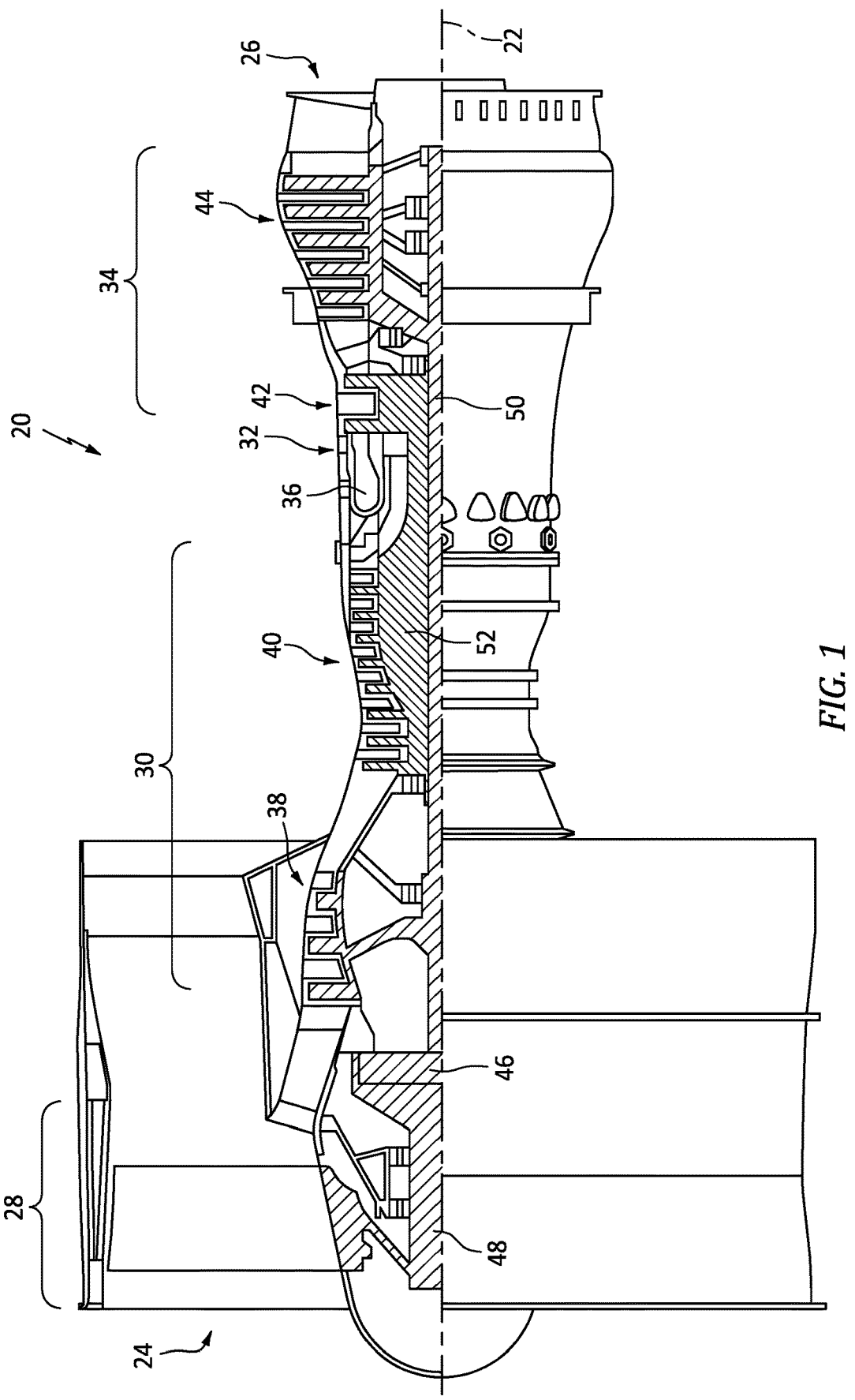
FIG. 1 is a diagrammatic sectional view of a gas turbine engine embodiment.

FIG. 1 shows a partially sectioned diagrammatic view of a geared gas turbine engine 20. The gas turbine engine 20 extends along an axial centerline 22 between an upstream airflow inlet 24 and a downstream airflow exhaust 26. The gas turbine engine 20 includes a fan section 28, a compressor section 30, a combustor section 32, and a turbine section 34. The combustor section 32 includes an annular combustor 36. The compressor section includes a low-pressure compressor (LPC) 38 and a high-pressure compressor (HPC) 40. The turbine section 34 includes a high-pressure turbine (HPT) 42 and a low-pressure turbine (LPT) 44. In the embodiment shown in FIG. 1, the engine sections are arranged sequentially along the centerline 22 within an engine housing. The fan section 28 is connected to a geared architecture 46, for example, through a fan shaft 48. The geared architecture 46 and the LPC 38 are connected to and driven by the LPT 44 through a low-speed shaft 50. The HPC 40 is connected to and driven by the HPT 42 through a high-speed shaft 52. The terms "forward", "leading", "aft, "trailing" are used herein to indicate the relative position of a component or surface. As air passes through the engine 20, a "leading edge" of a stator vane or rotor blade encounters the air before the "trailing edge" of the same. In a conventional axial engine such as that shown in FIG. 1, the fan section 28 is "forward" of the compressor section 30 and the turbine section 34 is "aft" of the compressor section 30. The terms "inner radial" and "outer radial" refer to relative radial positions from the engine centerline 22. An inner radial component or path is disposed radially closer to the engine centerline 22 than an outer radial component or path. The gas turbine engine diagrammatically shown in FIG. 1 is an example provided to facilitate the description herein. The present disclosure is not limited to any particular gas turbine engine configuration, including the two-spool engine configuration shown, and may be utilized with single spool gas turbine engines as well as three spool gas turbine engines and the like.

During operation, air enters the gas turbine engine 20 through the airflow inlet 24 and may be directed through the fan section 28 and into a core gas path. The gas traveling along the core gas path is directed through the engine sections 30, 32, 34 and exits the gas turbine engine 20 through the airflow exhaust 26 to provide forward engine thrust. Within the combustor section 32, fuel is injected into a combustor 36 and mixed with compressed air. This fuel-air mixture is ignited to power the gas turbine engine 20. The non-combusted air and combustion products produced in the combustor 36 pass to the turbine section 34 where they power the turbine section 34.

Figure 2:
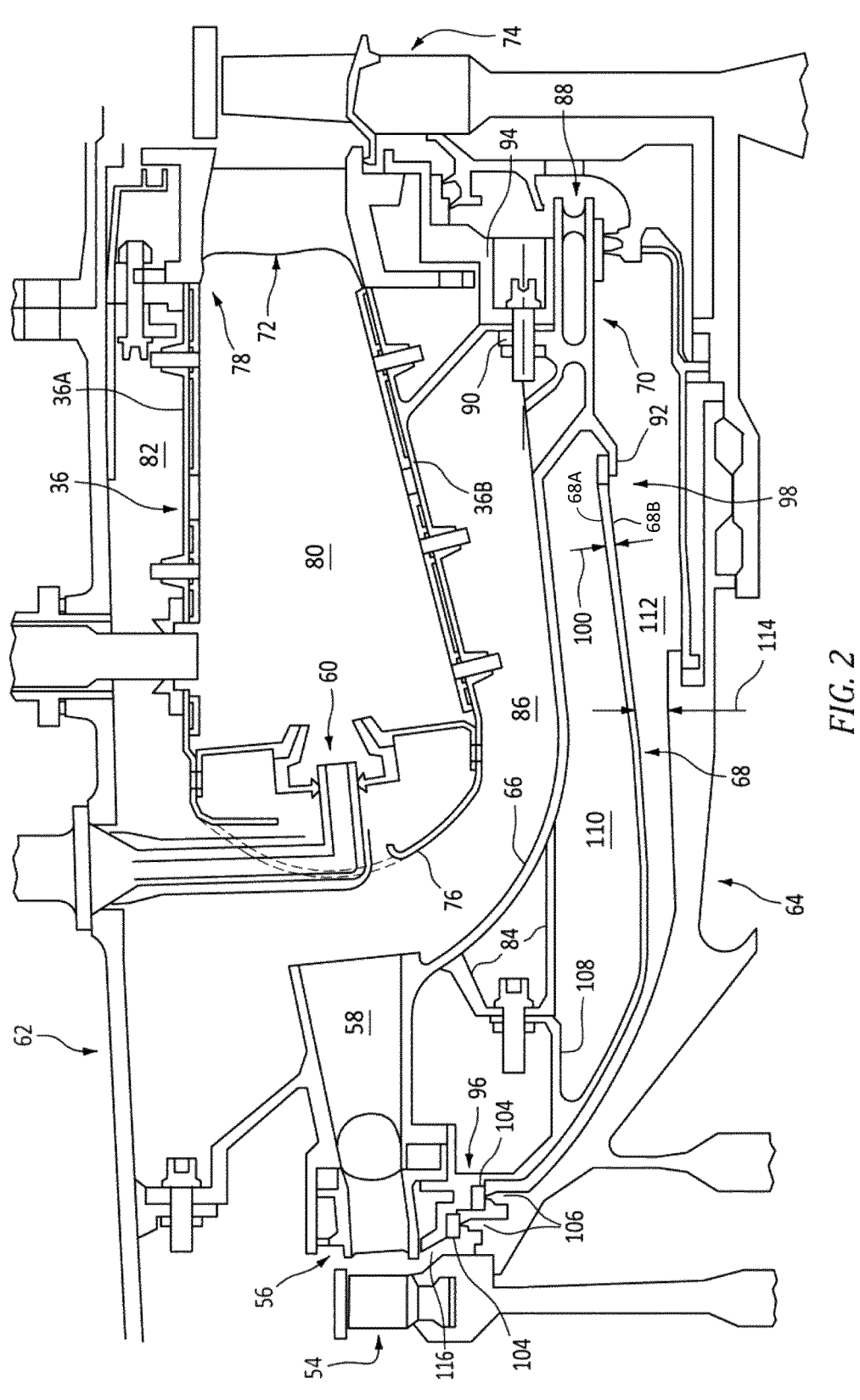
FIG. 2 is a diagrammatic partial view of a diffuser section embodiment of the present disclosure.

FIG. 2 is a diagrammatic cross-sectional partial view of a gas turbine engine embodiment according to aspects of the present disclosure. FIG. 2 shows an aftmost HPC rotor stage 54, an HPC exit guide vane stage 56, an HPC discharge 58, an annular combustor 36, one of a plurality of combustor fuel nozzles 60, an outer casing 62, an HPC aft hub 64, an inner diffuser case 66, an HPC leakage guide structure 68, a tangential onboard injector ("TOBI") 70, an HPT first vane stage 72, and a first HPT rotor stage 74. The HPC discharge 58, annular combustor 36, outer casing 62, HPC aft hub 64, inner diffuser case 66, HPC leakage guide structure 68, TOBI 70, turbine first vane stage 72, and the first HPT rotor stage 74 are configured as annular structures.

The annular combustor 36 includes an outer radial wall structure 36A, an inner radial wall structure 36B, a forward bulkhead 76, an aft annular exit 78, and a combustion chamber 80. The combustion chamber 80 is defined by the inner and outer radial wall structures 36B, 36A, the forward bulkhead 76, and the aft annular exit 78. Inner and outer flanges secure the annular combustor 36. A portion of each combustor fuel nozzle 60 is received within the forward bulkhead 76.

The outer casing 62 is spaced apart from the combustor outer radial wall structure 36A and defines a passage (i.e., diffuser OD flow cavity 82) therebetween.

The inner diffuser case 66 extends forward to aft from the HPC discharge 58 to the TOBI 70. The inner diffuser case 66 includes an inner radial flange 84. The inner diffuser case 66 is spaced apart from the combustor inner radial wall structure 36B and defines a passage (i.e., the diffuser ID flow cavity 86) therebetween.

The TOBI 70 is disposed proximate to the aft end of the inner diffuser case 66. The TOBI 70 includes a plurality of nozzles 88, an outer radial flange 90, and an inner radial flange 92. The nozzles 88 are spaced apart from one another around the circumference of the TOBI 70. In the embodiment shown in FIG. 2, the outer radial flange 90 extends radially outwardly and is configured for connection with the annual combustor 36 and a turbine first vane inner radial support 94. The present disclosure is not limited to any particular TOBI outer radial flange 90 configuration. The TOBI inner radial flange 92 extends radially inwardly and is configured for engagement with an HPC leakage guide structure 68 as will be described herein. The TOBI 70 is configured to direct air through the nozzles 88 and that air may be further directed to the HPT first rotor stage 74 for cooling purposes. U.S. patent application Ser. No. 18/130, 872, "Gas Turbine Engine with Bypass TOBI Cooling/Purge Flow and Method", and U.S. Patent Application No. 63/460, 221, "Intercooled Combustor Nozzle Guide Vane and Secondary Air System", both of which are hereby incorporated by reference in their respective entirety, disclose TOBI configurations for directing air to the HPT first rotor stage 74 for cooling and/or purging purposes. The TOBI configurations disclosed in the aforesaid applications represent non-limiting examples that may be used with the present disclosure, and the present disclosure is not limited thereto.

The HPC leakage guide structure 68 has a forward end 96, an aft end 98, and a thickness 100 that extends between two opposing surfaces 68A, 68B. In some embodiments, the HPC leakage guide structure 68 may be a solid panel. In other embodiments, the HPC leakage guide structure 68 may include a plurality of apertures 102 (e.g., see FIG. 3) that extend through the thickness 100. The HPC leakage guide structure forward end 96 is disposed proximate to and radially inside of the HPC exit guide vane stage 56. The HPC leakage guide structure aft end 98 is engaged with a TOBI bracket. At the forward end 96, the HPC leakage guide structure 68 includes sealing structure (e.g., seal members 104) configured to engage with seal structure (e.g., knife edge seals 106) attached to the rotating HPC aft hub 64. Adjacent to the forward end 96, the HPC leakage guide structure 68 includes a mounting flange 108. In the embodiment shown in FIG. 2, the mounting flange 108 is configured for attachment with the inner radial flange 84 of the inner diffuser case 66. The aft end 98 of the HPC leakage guide structure 68 is engaged with the TOBI inner radial flange 92. The engagement between the aft end 98 of the HPC leakage guide structure 68 and the TOBI inner radial flange 92 may take several different forms. For example and referring to FIGS. 4-4C, the aft end 98 of the HPC leakage guide structure 68 and the TOBI inner radial flange 92 may be configured for a biased connection therebetween, wherein the aft end 98 of the HPC leakage guide structure 68 is biased against the TOBI inner radial flange 92 (e.g., see FIG. 4). The biasing force may be sufficient to maintain the aft end 98 of the HPC leakage guide structure 68 in contact with the TOBI inner radial flange 92 during engine operation. The biased connection may be referred to as a "snap fit". As another example, the aft end 98 of the HPC leakage guide structure 68 and the TOBI inner radial flange 92 may be configured for a mechanical engagement there between; e.g., a male and female type structure wherein an element disposed on one of the aft end 98 of the HPC leakage guide structure 68 or the TOBI inner radial flange 92 is received within an element of the other of the aft end of the HPC leakage guide structure 68 (e.g., see FIGS. 4A-4C). FIG. 4C diagrammatically illustrates a splined connection (i.e., a type of mechanical engagement) between the aft end 98 of the HPC leakage guide structure 68 and the TOBI inner radial flange 92. In some embodiments, the mechanical engagement may be configured with an interference fit (e.g., a snap fit) that selectively maintains the structures engaged with one another. In some instances (e.g., see FIG. 4B), the aft end 98 of the HPC leakage guide structure 68 may be configured to provide a linear surface transition with the TOBI inner radial flange 92 to avoid any flow impediment relative thereto. As another example, the aft end 98 of the HPC leakage guide structure 68 and the TOBI inner radial flange 92 may be attached to one another by mechanical fasteners, or the like. The above examples of how the aft end 98 of the HPC leakage guide structure 68 and the TOBI inner radial flange 92 may be engaged with one another are intended to be nonlimiting examples.

Figure 3:
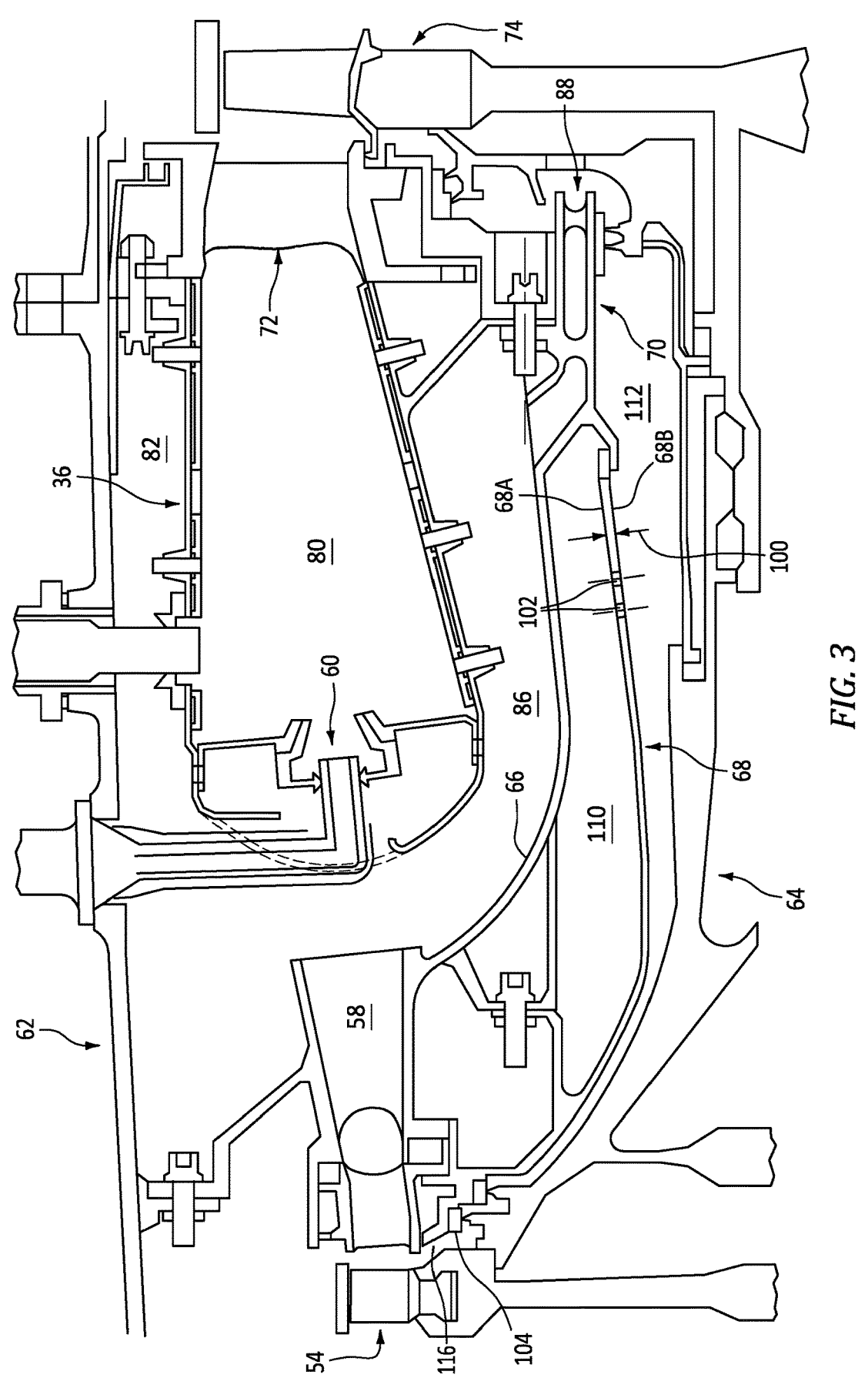
FIG. 3 is a diagrammatic partial view of a diffuser section embodiment of the present disclosure.
Figure 4A:
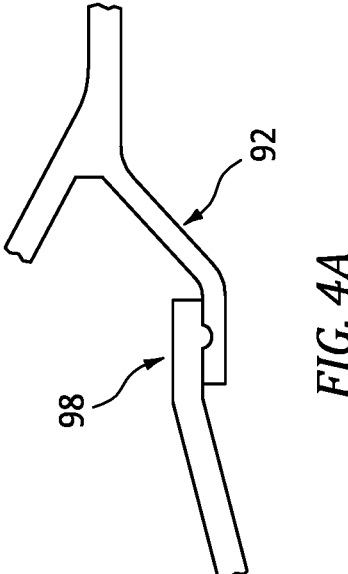
FIGS. 4-4C are diagrammatic views of embodiments of the engagement between the aft end of the high pressure compressor leakage guide structure and a TOBI flange.
Figure 4C:
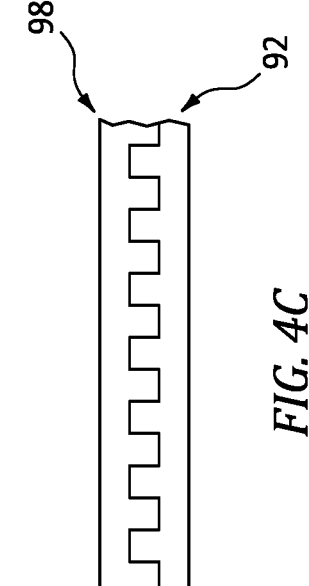
Figure 4:
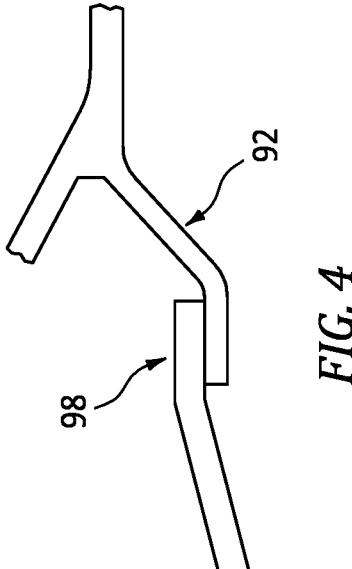
Figure 4B:
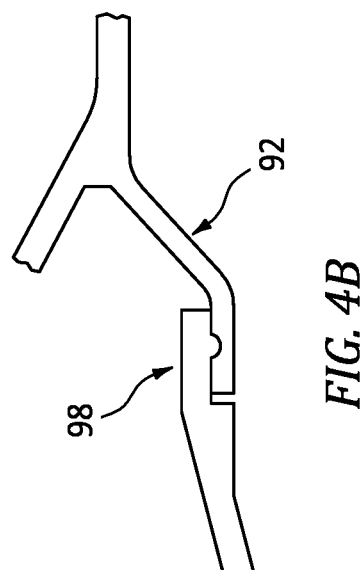

Referring to FIGS. 2 and 3, the HPC leakage guide structure 68 is spaced apart from the inner diffuser case 66 and defines an annular cavity (i.e., the diffuser secondary cavity 110) therebetween. The HPC leakage guide structure 68 is also spaced apart from the HPC aft hub 64 and defines an annular cavity (i.e., the HPC aft hub cavity 112) there between. The HPC aft hub cavity 112 may be described as having a radial height 114 that extends between the HPC leakage guide structure 68 and the HPC aft hub 64. In the embodiment diagrammatically shown in FIG. 2, the HPC aft hub cavity 112 is monotonically increasing in the direction of forward to aft; e.g., the radial height 114 that extends between the HPC leakage guide structure 68 and the HPC aft hub 64 may remain constant for a short axial length, but increases overall axially forward to aft, and does not decrease.

During operation of the engine, air is compressed within the compressor section 30. Aft of the aftmost HPC rotor stage 54, a leakage path 116 exists through the inner diameter of the gas flow path. Leakage air exiting the compressor section 30 through the leakage path 116 encounters one or more seals (e.g., knife edge seals 106) configured to control the amount of the leakage air exiting the compressor section 30. Downstream of the seals 106, the leakage air enters the HPC aft hub cavity 112 defined between the HPC leakage guide structure 68 and the HPC aft hub 64. The HPC leakage guide structure 68 separates the HPC aft hub cavity 112 from the diffuser secondary cavity 110. In those embodiments wherein the HPC leakage guide structure 68 is a solid panel, air passage is not permitted through the HPC leakage guide structure 68. In those embodiments wherein the HPC leakage guide structure 68 includes a plurality of apertures 102, air passage therethrough is permitted. Hence, the HPC leakage guide structure 68 is configured to separate the diffuser secondary cavity 110 and the HPC aft hub cavity 112, and may be configured to allow no air passage therebetween (i.e., no apertures) or may be configured to allow some predetermined amount of air passage therebetween via apertures 102. Air disposed within the diffuser secondary cavity 110 may originate from one or more of several different sources; e.g., depending on specific engine secondary air flow characteristics. For example, in some applications leakage air (e.g., entering the cavity 110 proximate the forward flanges 84, 108) may predominate the diffuser secondary cavity 110, or cooling air from a cooling air source (e.g., compressor bled air, compressor bled air that has been cooled in a heat exchanger, and the like) may predominate the diffuser secondary cavity 110, or the like or any combination thereof. The present disclosure is not limited to a diffuser secondary cavity 110 containing air from any particular source.

The engagement between the aft end 98 of the HPC leakage guide structure 68 and the TOBI inner radial flange 92 is in contrast to a configuration wherein at least a portion of the HPC leakage guide structure 68 is cantilevered and therefore unsupported at the aft end (not shown). As stated above, the environment within the diffuser region of a gas turbine engine 20 during operation is one in which numerous vibratory drivers exist and these drivers can cause components to oscillate in a plurality of different modes. Under some operating conditions, the component oscillation may reach resonance. Component oscillation can have several unintended effects. For example, vibration of a component that defines a flow passage can cause a periodic variation in the cross-sectional area (i.e., the axial flow area) of the flow passage. An air flow passage that constricts and expands periodically can produce pressure and/or flow velocity oscillations as well as mass flow oscillations any of which may be referred to as acoustic oscillations. These flow oscillations, in turn, can affect the work performed by the airflow (e.g., cooling, purging, and the like) and can increase the potential for component fatigue. The potential for periodic flow variability is exacerbated when the flow passage includes a narrowed region (e.g., a throat associated with a knife edge seal, or other pinch point, or the like) because the oscillation of the panel may have a more pronounced effect in the narrowed region.

Figure 5:
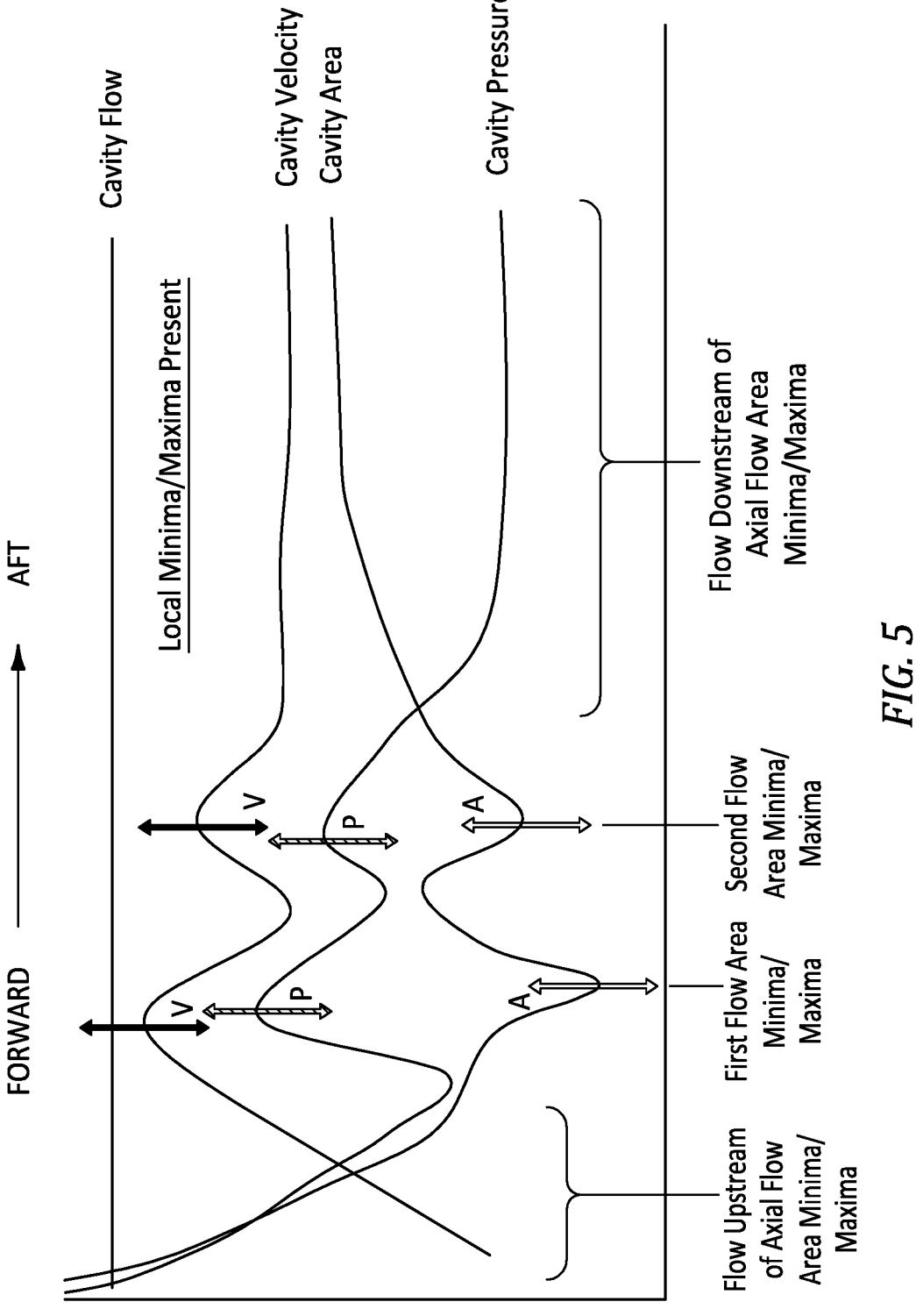
FIG. 5 is a chart diagrammatically illustrating flow characteristics within an HPC aft hub cavity associated with an HPC aft hub cavity that is defined, at least in part, by a cantilevered HPC leakage guide structure.
Figure 6:
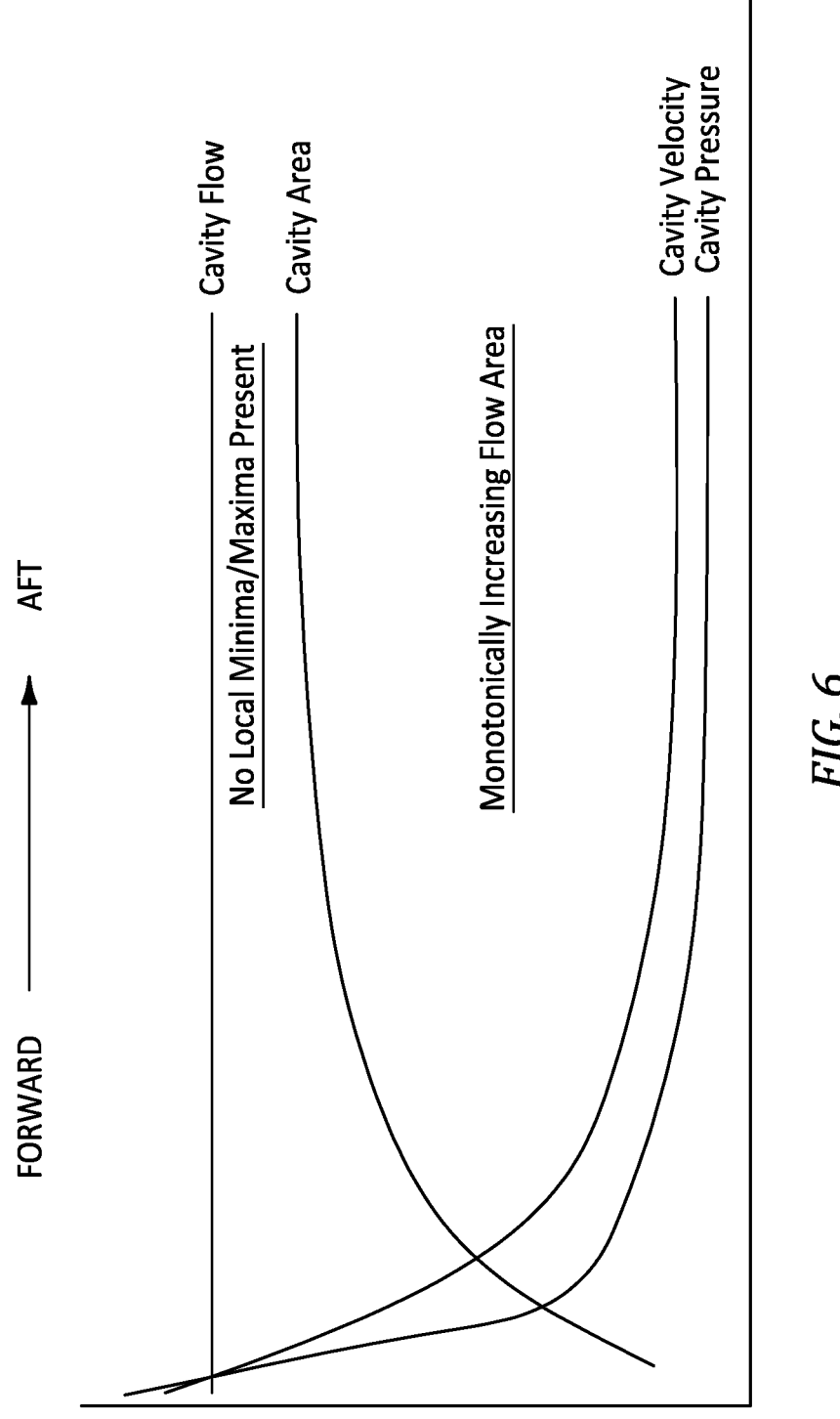
FIG. 6 is a chart diagrammatically illustrating flow characteristics within an HPC aft hub cavity associated with an HPC aft hub cavity that is defined, at least in part, by an HPC leakage guide structure that is sported at both axial ends.

The chart in FIG. 5 diagrammatically illustrates in the direction from forward to aft along the axial centerline 22, flow characteristics of leakage path 116 within an HPC aft hub cavity 112 that includes regions of "flow upstream of maxima/minima", a first flow area minima/maxima, a second flow area minima/maxima, and a "flow downstream of maxima/minima". The data diagrammatically shown in FIG. 5 diagrammatically represents the distance within the leakage path 116 from a forward position proximate to the start of the leakage path (i.e., at the interface between the aftmost HPC rotor stage 54 and the HPC exit guide vane stage 56) to an aft position proximate to where the HPC leakage guide structure aft end 98 engages with the TOBI inner radial flange 92. The data diagrammatically shown in FIG. 5 is representative of an HPC aft hub cavity 112 that is defined, at least in part, by a cantilevered unsupported guide structure. The term "minima/maxima" is used to refer to the fact that because of an oscillatory response of an unsupported HPC leakage guide structure, flow past a pinch point may oscillate between a maximum and a minimum passage cross-section; i.e., axial flow area. As can be seen in FIG. 5, flow static pressure in the flow upstream of maxima/minima region decreases but is not periodic. In this region, the decrease in flow pressure is a function of the solid body rotational flow relative to the static structure 68. In the regions containing the local mimima/maxima (i.e., axial flow area), the unsupported leakage guide structure oscillates, producing the axial flow area minima/maxima, and also likely producing corresponding oscillations in flow static pressure and flow velocity. FIG. 6 diagrammatically illustrates flow characteristics within an HPC aft hub cavity 112 like that associated with the present disclosure wherein the HPC leakage guide structure 68 is engaged at both axial ends. For example, the HPC leakage guide structure 68 is attached at the forward end 96 and the aft end 98 is engaged with the TOBI 70; e.g., the TOBI inner radial flange 92. Hence, any vibrational response by (e.g., deflection of) the HPC leakage guide structure 68 will be mitigated by the opposite end attachment points. As a result, oscillation of flow passing through the HPC aft hub cavity 112/acoustic oscillations will also be mitigated. Like FIG. 5, the data shown in FIG. 6 represents the distance within the leakage path 116 from a forward position proximate to the start of the leakage path (i.e., at the interface between the aftmost HPC rotor stage 54 and the HPC exit guide vane stage 56) to an aft position proximate to where the HPC leakage guide structure aft end 98 engages with the TOBI inner radial flange 92. FIG. 6 diagrammatically illustrates either no oscillation of the HPC leakage guide structure 68 (and therefore no maxima/minima) or the oscillations are of a magnitude that is inconsequential. As can be seen in FIG. 6, the flow characteristics (e.g., static pressure and velocity) are substantially more linear. FIG. 6 also represents flow characteristics associated with a monotonically increasing flow area (i.e., no flow pinch points) in a direction from forward to aft (between the above described leakage path 116 forward position to the aft position) as can be seen by the increase in axial flow area.

In those present disclosure embodiments wherein the HPC aft hub cavity 112 has a monotonically increasing configuration in the direction of forward to aft, the monotonically increasing configuration enables the HPC aft hub cavity 112 to function as a diffuser. The degree to which the HPC aft hub cavity 112 functions as a diffuser can be selected to condition the leakage flow therethrough (e.g., create a desirable flow pressure) for use as a cooling flow and/or a purging flow for downstream HPT components. As stated above, in some embodiments the HPC leakage guide structure 68 may include a plurality of apertures 102 that allow air passage therethrough. In some embodiments, the present disclosure may be configured to have some predetermined amount of air from the diffuser secondary cavity 110 to enter the HPC aft hub cavity 112 (via apertures 102) to affect the air characteristics in one or both of the diffuser secondary cavity 110, or the HPC aft hub cavity 112, or both. In this manner, the HPC leakage air may be conditioned both in terms of pressure and temperature for use in cooling downstream HPT components.

In short and as detailed above, the present disclosure decreases the potential for mechanical stress drivers in several different ways. The engagement between the aft end 98 of the HPC leakage guide structure 68 and the TOBI inner radial flange 92 mitigates or prevents vibratory oscillation of the HPC leakage guide structure 68 and thereby mitigates the associated stress drivers that can lead to undesirable fatigue. In addition, the absence of pinch points within the HPC aft hub cavity 112 mitigates the potential for axial flow area minima/maxima, and corresponding oscillations in flow static pressure and flow velocity associated therewith during engine operation, which oscillations are also associated with stress drivers that can lead to undesirable fatigue. Finally, in those embodiments wherein the HPC aft hub cavity 112 monotonically increases, the HPC aft hub cavity 112 functions as a diffuser which also mitigates HPC aft hub cavity 112 pressure oscillations and the stress drivers associated therewith.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted is a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible.

The invention claimed is:

1. A gas turbine engine having an axial centerline, comprising:
    a compressor section having a high pressure compressor (HPC), wherein the HPC includes an HPC aft hub;
    a combustor section having a combustor;
    a turbine section;
    wherein a core gas path extends through the compressor section, the combustor section, and the turbine section;
    a tangential on board injector (TOBI) system that extends circumferentially around the engine axial centerline, the TOBI system having a plurality of nozzles and a TOBI inner radial flange; and
    an HPC leakage guide structure (LGS) having a LGS forward end and a LGS aft end, wherein the LGS forward end is disposed and configured to receive a leakage flow from the HPC and the LGS aft end is engaged with the TOBI inner radial flange;
    wherein the HPC leakage guide structure and the HPC aft hub are separated from one another and define an HPC aft hub cavity therebetween, wherein the HPC aft hub cavity extends between the LGS forward end and the LGS aft end,
    wherein the HPC aft hub cavity monotonically increases in a direction from the LGS forward end to the LGS aft end,
    wherein the HPC aft hub cavity monotonically increasing from the LGS forward end of the HPC leakage guide structure to a position where the LGS aft end and the TOBI inner radial flange engage, such that a radial height of the HPC aft hub cavity at the LGS forward end is less than a radial height of the HPC aft hub cavity at the position where the LGS aft end and the TOBI inner radial flange engage; and
    wherein the LGS aft end axially overlaps and is radially biased against the TOBI inner radial flange.

2. The gas turbine engine of claim 1, wherein the LGS aft end and the TOBI inner radial flange are configured for mechanical engagement with one another.

3. The gas turbine engine of claim 2, wherein the mechanical engagement of the LGS aft end and the TOBI inner radial flange is a mating configuration.

4. The gas turbine engine of claim 3, wherein the mating configuration is a splined configuration.

5. The gas turbine engine of claim 1, wherein the HPC leakage guide structure has a thickness that extends between two surfaces and the HPC leakage guide structure is a solid panel.

6. The gas turbine engine of claim 1, wherein the HPC leakage guide structure has a thickness that extends between two surfaces and the HPC leakage guide structure includes a plurality of apertures extending through the thickness.

7. The gas turbine engine of claim 1, further comprising:
an inner diffuser case disposed radially inside of and spaced apart from the combustor, wherein the inner diffuser case and the combustor define a diffuser inner diameter cavity therebetween; and
    wherein the inner diffuser case is disposed radially outside of and spaced apart from the HPC leakage guide structure, wherein the inner diffuser case and the HPC leakage guide structure define a diffuser secondary cavity therebetween.

8. The gas turbine engine of claim 7, wherein the HPC leakage guide structure is connected to the inner diffuser case.

9. The gas turbine engine of claim 7, wherein the HPC leakage guide structure includes an LGS mounting flange disposed adjacent the LGS forward end and the LGS mounting flange is connected to the inner diffuser case.

10. The gas turbine engine of claim 7, wherein the HPC leakage guide structure has a thickness that extends between two surfaces and the HPC leakage guide structure is a solid panel.

11. The gas turbine engine of claim 7, wherein the HPC leakage guide structure has a thickness that extends between two surfaces and the HPC leakage guide structure includes a plurality of apertures extending through the thickness thereby providing a fluid passage between the HPC aft hub cavity and the diffuser secondary cavity.

12. A gas turbine engine having an axial centerline, comprising:
    a compressor section having a high pressure compressor (HPC), wherein the HPC includes an HPC aft hub;
    a combustor section having a combustor;
    a turbine section;
    wherein a core gas path extends through the compressor section, the combustor section, and the turbine section;
    a tangential on board injector (TOBI) system that extends circumferentially around the engine axial centerline, the TOBI system having a plurality of nozzles and a TOBI inner radial flange; and
    an HPC leakage guide structure (LGS) extending between a LGS forward end and a LGS aft end, wherein the LGS forward end engages the HPC aft hub, the LGS forward end is disposed and configured to receive a leakage flow from the HPC, and the LGS aft end is engaged with the TOBI inner radial flange;

wherein the HPC leakage guide structure and the HPC aft hub are separated from one another and define an HPC aft hub cavity therebetween, wherein the HPC aft hub cavity extends between the LGS forward end and the LGS aft end, wherein the HPC aft hub cavity monotonically increases from the LGS forward end to a distal end of the TOBI inner radial flange which engages the LGS aft end, such that a radial height of the HPC aft hub cavity at the LGS forward end is less than a radial height of the HPC aft hub cavity at the distal end of the TOBI inner radial flange.

13. The gas turbine engine of claim 12, wherein the LGS aft end axially overlaps and is radially biased against the TOBI inner radial flange.

\* \* \* \* \*